Jan. 8, 1935.   R. E. GILLMOR   1,986,807
GYROSCOPE AND GYROSCOPIC COMPASS
Original Filed Nov. 24, 1928   6 Sheets-Sheet 1
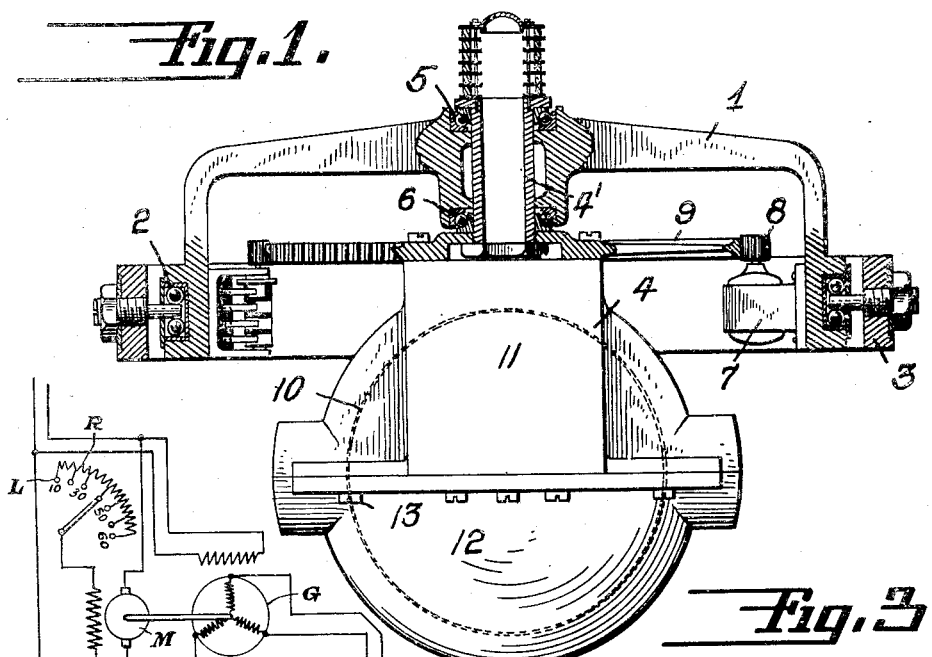
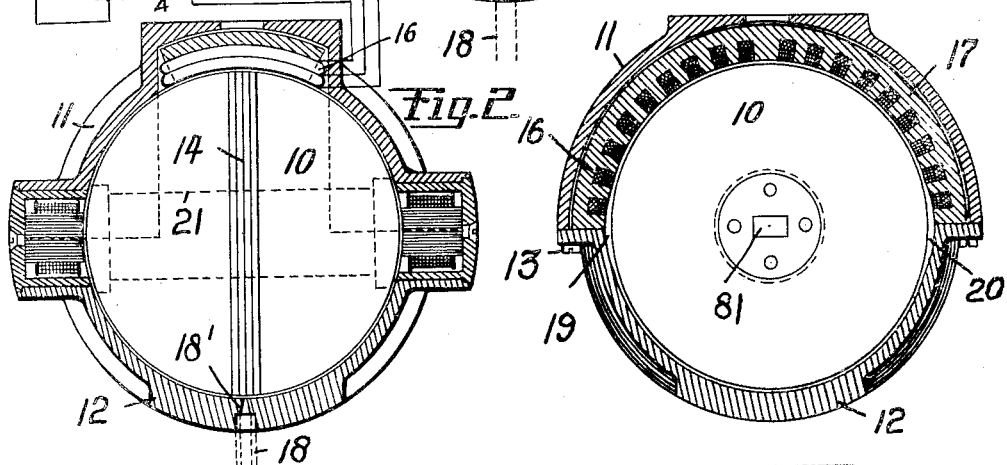
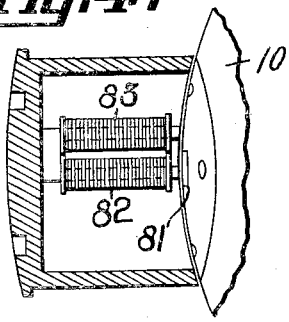
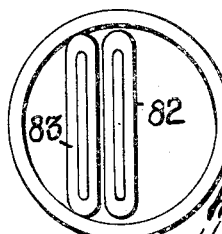
INVENTOR
Reginald E. Gillmor.
BY
Herbert H. Thompson
his ATTORNEY.

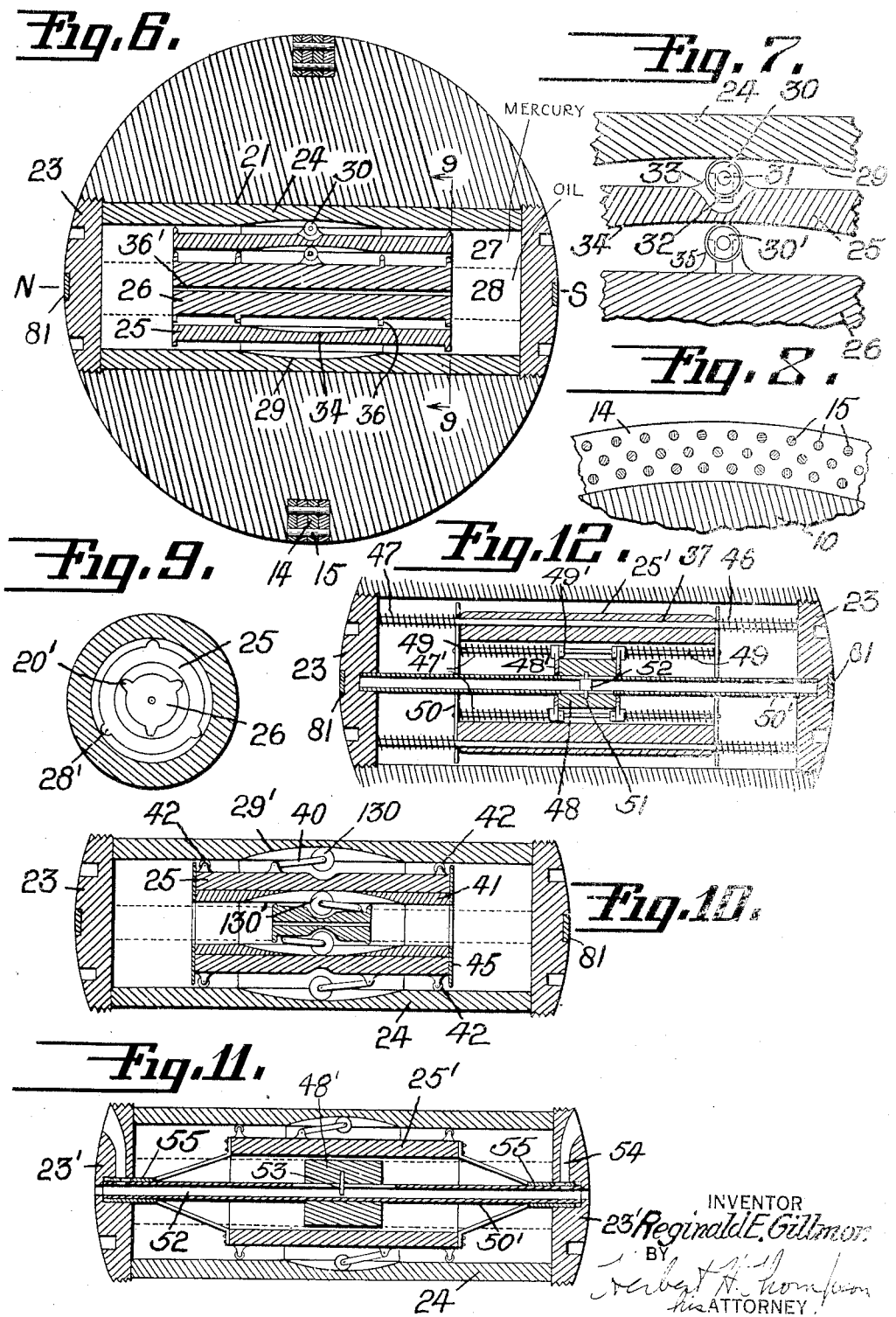

Jan. 8, 1935.  R. E. GILLMOR  1,986,807
GYROSCOPE AND GYROSCOPIC COMPASS
Original Filed Nov. 24, 1928  6 Sheets-Sheet 3
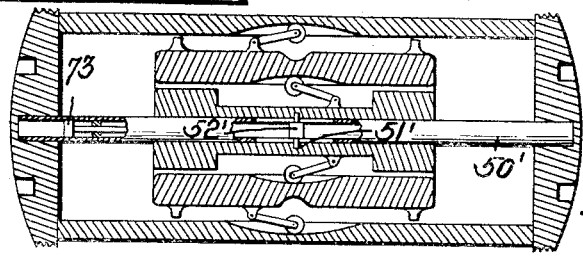
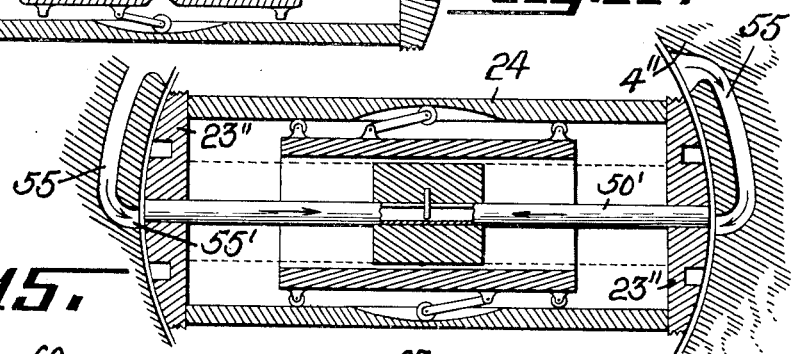
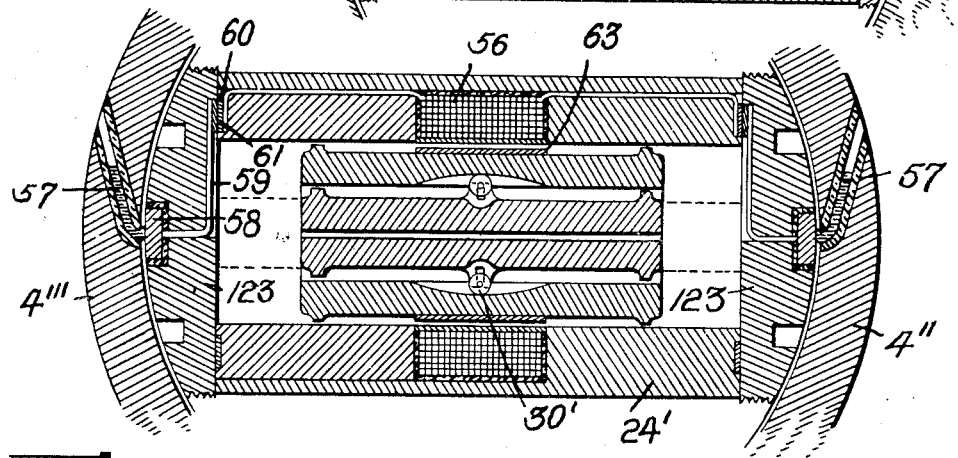
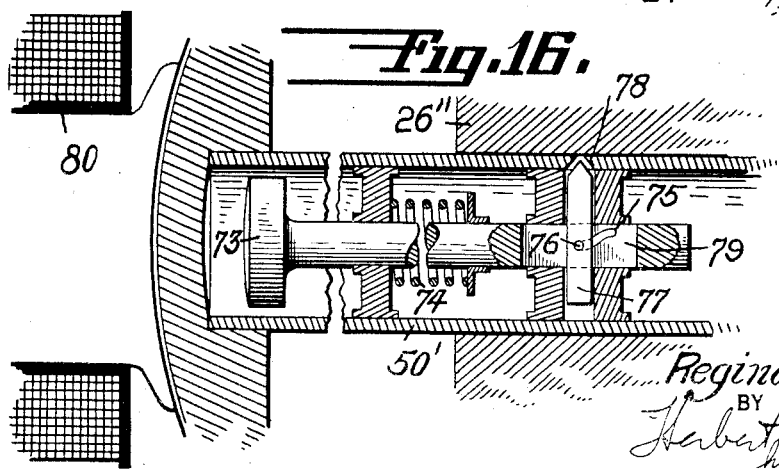
INVENTOR
Reginald E. Gillmor
BY
Herbert H. Thompson
his ATTORNEY.

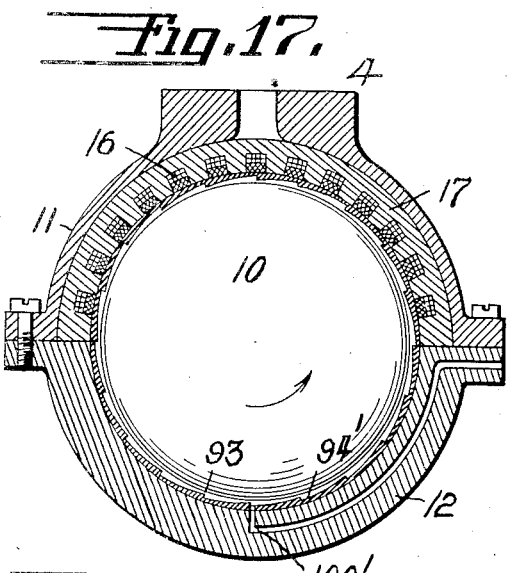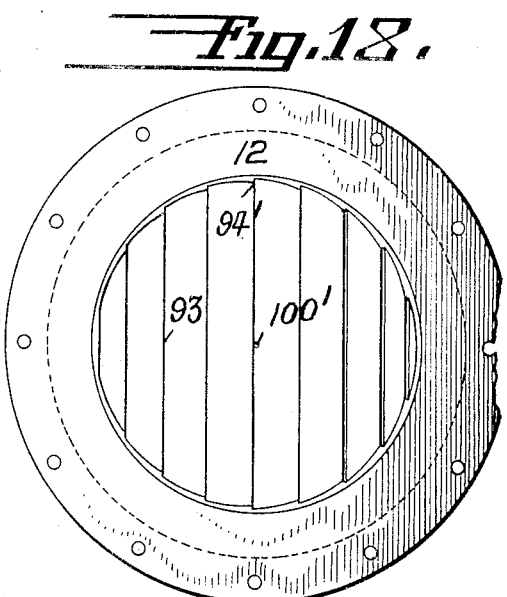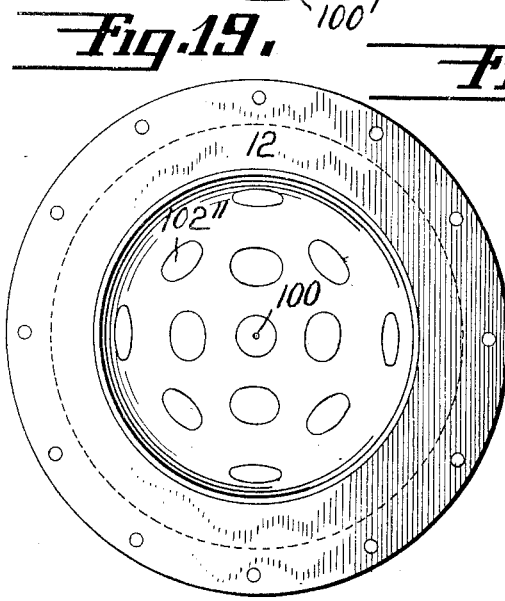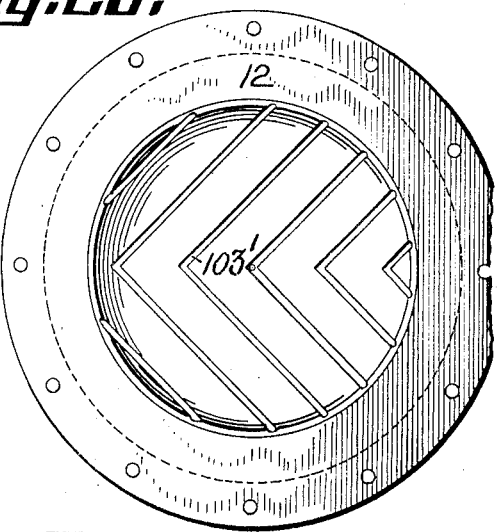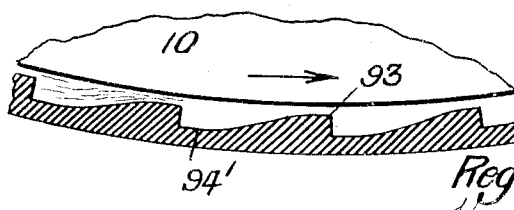

Jan. 8, 1935.　　　　R. E. GILLMOR　　　　1,986,807
GYROSCOPE AND GYROSCOPIC COMPASS
Original Filed Nov. 24, 1928　　6 Sheets-Sheet 5
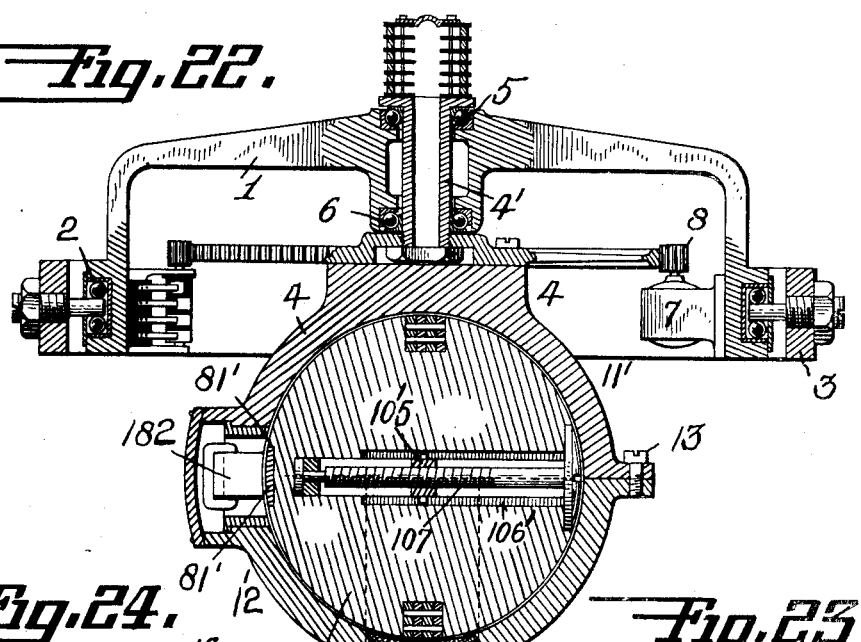
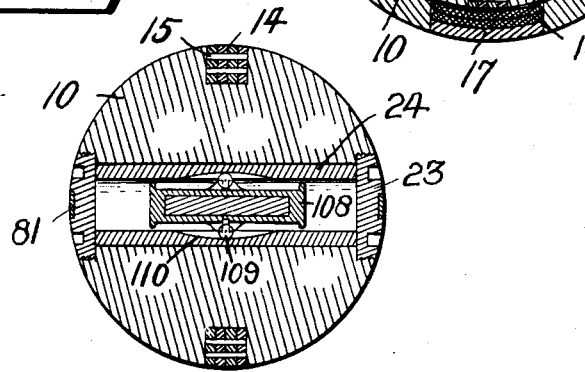
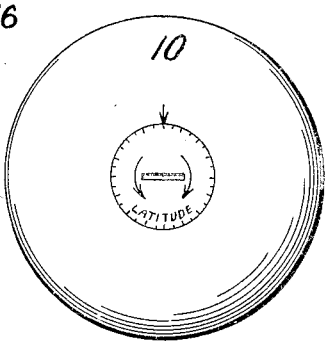
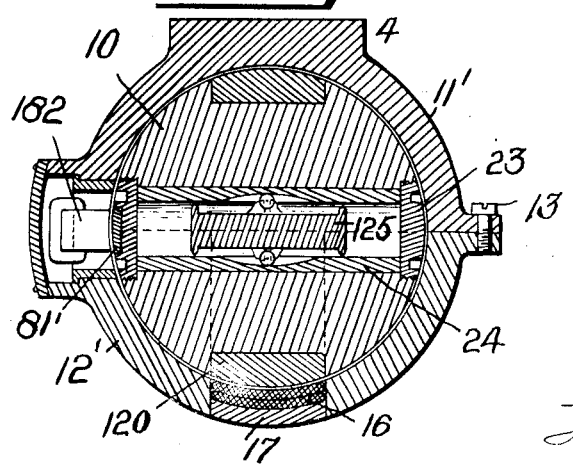
INVENTOR
Reginald E. Gillmor.
BY
Herbert H. Thompson
his ATTORNEY.

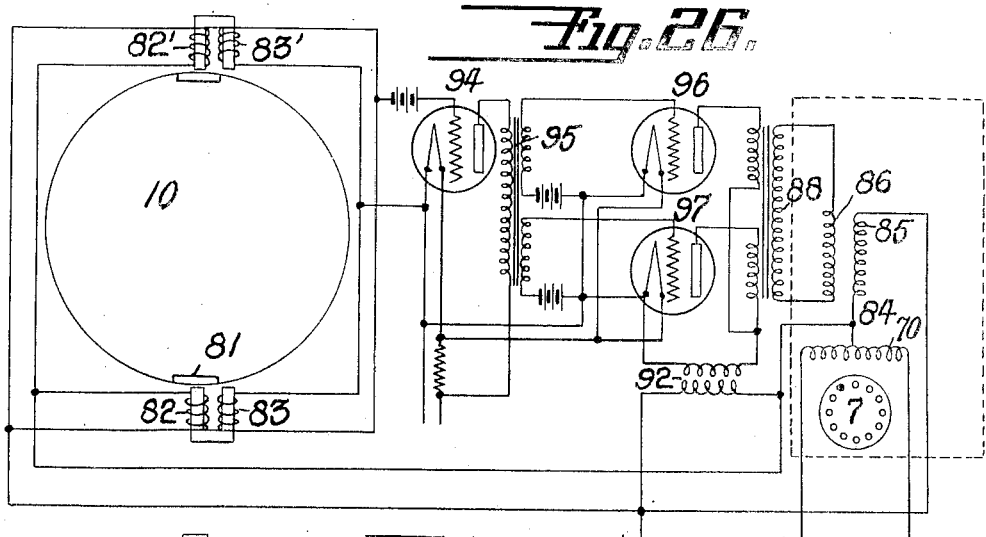
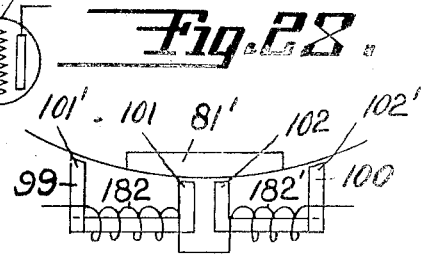
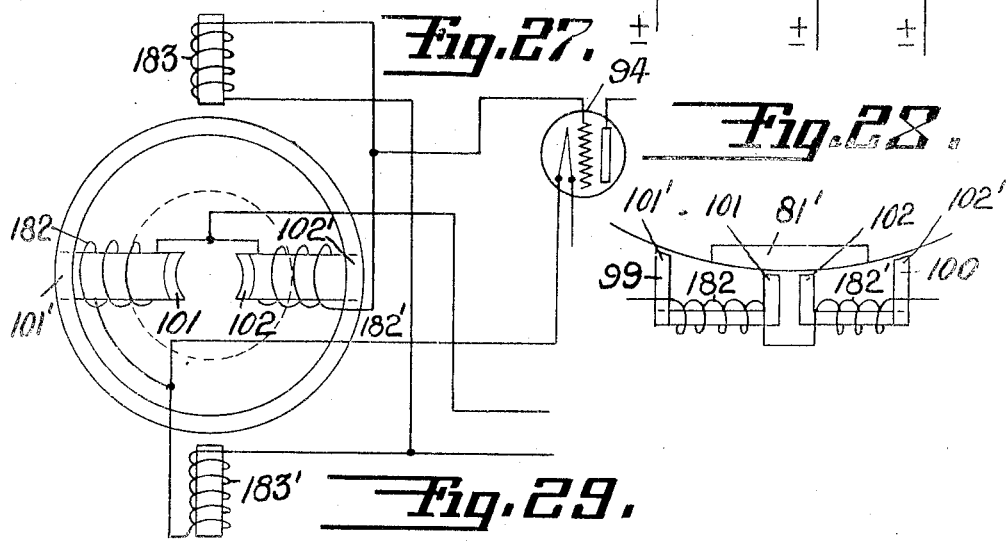
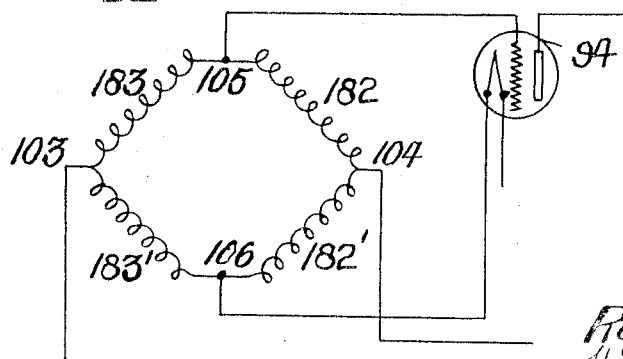

Patented Jan. 8, 1935

1,986,807

UNITED STATES PATENT OFFICE 1,986,807

GYROSCOPE AND GYROSCOPIC COMPASS

Reginald E. Gillmor, Stamford, Conn.

Application November 24, 1928, Serial No. 321,587
Renewed April 29, 1933

44 Claims. (Cl. 33—226)

This invention relates to simplified gyroscopes, especially of the gyroscopic compass class in which the usual horizontal and vertical bearings for the sensitive element are eliminated by making the sensitive element or principal portion thereof of spherical shape and floating or supporting it on the air stream generated primarily by its own rotation. By this means a universal support of great sensitivity is secured and the troubles with the usual forms of bearings eliminated. In addition, my improved form of compass eliminates largely the many delicate balancing operations which are necessary in present types of compasses on the market, so the only strictly balancing operation with my type of compass is the single operation of balancing the sphere itself. A further object of the invention is to devise an improved supporting and actuating means for the follow-up element of the compass. A further object of the invention is to devise novel gravitational and damping elements especially adapted for the sphere type of compass but also having application to other types of compasses.

Referring to the drawings in which several preferred forms of the invention are shown:

Fig. 1 is a north elevation, partly in section, of the assembled compass.

Fig. 2 is a similar sectional elevation through the supporting and follow-up element for the sphere.

Fig. 3 is a section taken in the plane at right angles to Fig. 2, i. e., the E—W plane.

Fig. 4 is a detail of one form of controller for the follow-up system.

Fig. 5 is a view taken at right angles to Fig. 4 of the controller-transformer of this figure.

Fig. 6 is a section taken in the east-west plane through the sphere.

Fig. 7 is an enlarged view of the centralizing rollers of Fig. 6.

Fig. 8 is an enlarged sectional detail of the squirrel cage rotor construction forming a part of the sphere.

Fig. 9 is a cross-section taken on line 9—9 of Fig. 6.

Fig. 10 is a longitudinal sectional view of a modified form of the gravitational and damping element for the sphere compass.

Fig. 11 is a similar view of a further modification.

Fig. 12 is a similar view of a third modification using springs for centralizing the floats.

Fig. 13 is a similar view of another modification in which only one liquid need be employed within the chamber.

Fig. 14 is a similar view of another modification in which air pressure generated by the revolving sphere is utilized.

Fig. 15 is a similar view of another modification utilizing electrical centralizing means.

Fig. 16 is an enlarged detail of a magnetically operated lock for eliminating the damping when desired.

Fig. 17 is a view similar to Fig. 3 but showing a modified construction for the interior of the hollow sphere supporting the spinning sphere for increasing the air-supporting action.

Fig. 18 is a top plan view of the lower half only of the supporting hollow sphere of Fig. 17.

Fig. 19 is a similar view showing a modified interior surface for the supporting shell.

Fig. 20 shows a still further modification.

Fig. 21 is an enlarged sectional detail of a portion of the shell.

Fig. 22 is a sectional elevation of a form of my invention adapted for use as a gunnery baseline.

Fig. 23 is an end view of the sphere thereof.

Fig. 24 is a sectional view of a modified form of sphere which is self-adjusting for latitude.

Fig. 25 is a sectional elevation of a modified form of damping means for my gyroscopic compass.

Fig. 26 is a wiring diagram showing the operation of the follow-up motor from the controller on the gyroscope.

Fig 26a is a vector diagram illustrating the damping principle of the form of the invention shown in Fig. 25.

Fig. 27 is a similar diagram in abbreviated form of a modified type of controller.

Fig. 28 is a diagrammatic view showing the shape of the pole pieces employed in Fig. 27.

Fig. 29 is a wiring diagram showing the theory of operation of this form of follow-up circuit.

The compass in Fig. 1 is shown as supported in the usual spider 1, which in turn is mounted for oscillation about both horizontal axes by bearings 2 within gimbal ring 3, which in turn is supported by bearings in an outer support (not shown). Journalled in said spider for turning about a vertical axis is the follow-up element 4 shown as comprising an upwardly extending stem 4' journalled adjacent its top and bottom in antifriction bearings 5 and 6 within the spider 1. Said follow-up frame is shown as driven in the usual manner by means of a motor 7 which drives through pinion 8 a gear 9 on the frame 4.

However, I employ none of the usual guide bearings for the vertical ring and horizontal bearings for the gyro rotor casing and the bearings for the rotor itself. Instead, I construct the follow-up element in the shape of a hollow shell within which I place the ball or sphere 10 which constitutes the entire sensitive element of the compass. All of the above mentioned sets of bearings are thereby eliminated. The interior of the follow-up element closely fits the ball 10 and a portion thereof at least may be constructed of moulded bakelite which may be moulded to the exact contour of the sphere. As shown the hollow shell is composed of an upper and lower part 11 and 12, the two parts being detachably bolted together by set screws 13.

For driving the sphere I prefer to employ an electrical means which requires no wire to be led into the rotating sphere. For this purpose I prefer to construct the sphere of non-magnetic material, such as bronze which may have cast into the equator thereof a rotor 14 of magnetic material, which rotor is preferably laminated and pierced by copper bars 15. Said bars preferably have an electrical contact with the metal walls of the slot so as to provide in effect a squirrel cage winding of an induction rotor. It should be noted that said bars are preferably placed below the surface of the laminations, piercing the same, so that they will not be thrown out by the centrifugal force of rotation. Although a laminated rotor pierced by copper bars serves my purpose most efficiently, I have found from experience that a solid steel or bronze rotor is quite effective and has some advantage in the way of low cost and in providing the damping action, as described in connection with Figs. 25 and 26a. The inductive A. C. stator winding 16 (Fig. 2) is preferably placed in slots in the laminated iron section 17 of the follow-up element. It will be noted that the field poles are materially wider than the laminations in the sphere. This is for the purpose of permitting a sufficient tilt of the sphere in any direction without exerting an undesirable centralizing torque thereon so that the only direct gravitational torque exerted on the sphere will be from the interior float or movable mass as hereinafter described. As shown, the windings may be confined to the upper half 11 of the follow-up element, although it is obvious that they may be extended also to the lower half if desired. By placing them on the upper half only, however, the ready detachability of the lower half 12 is not interfered with and also the weight of the sphere is somewhat lessened by the magnetic attraction of the windings. By having the ball wholly surrounded, the air friction or windage loss is reduced thereby requiring less power to spin the ball and a less tight coupling between the inductive spinning means and ball.

No other bearing is provided for the sphere than an air film between the cup and the sphere. It will be understood that by the use of the term "air" herein, I use it in the broad sense of any gaseous atmosphere in which it is desired to spin the sphere, as obviously, if desired, the ball may be spun in any kind of atmosphere. It will also be understood that the term "sphere" or "ball" is employed in a very broad sense, since it is obvious that the ends of the sphere adjacent the ends of the spinning axis could be cut off to form flattened ends, if desired, without in any way departing from the broad principles of my invention. In starting up the sphere it will, of course, be necessary to supply sufficient air or other gas between these members to free the sphere from contact with the cup. To accomplish this I have shown a pipe 18 leading into the bottom of the portion 12 and serving to introduce compressed air between the cup and sphere at nozzle 18'. As the sphere picks up speed, however, I find that the air pressure generated by the rotation of the sphere is in most instances sufficient to effectively float the sphere. In order to increase this film, the cup may be enlarged at one or more places 19—20 to permit ingress of fresh cool air and egress of the heated air. In this case the air acts in a closely similar manner to lubricating oil in a radial bearing, being drawn in where the clearance is largest and compressed where the clearance is smallest. Air, however, as a supporting medium, has the great advantages over lubricating oil of very much less viscosity and density and much greater mobility. It is, of course, obvious, if for any reason the self-generated air film is insufficient to entirely free the sphere from contact with the cup, that a small amount of compressed air may continue to be supplied through nozzle 18' during the rotation of the sphere, although I prefer to use only the self-generated film.

For imparting meridian seeking properties to the compass, I prefer to place at least the gravitational factor and possibly also the damping factor directly within the sphere itself so that the sensitive element is entirely self-contained and needs no external factors for proper action. As shown, I provide a bore 21 extending diametrically through the sphere at right angles to the plane of the rotor laminations, and within this bore I place an element or elements which are responsive to gravity, preferably one or more movable masses supported by or within a fluid or fluids.

According to Fig. 6, I close the ends of the bore by threaded caps 23 which seal and clamp therein an outer tube 24. Freely mounted within the tube are shown an outer thimble or float 25 and a cylindrical weight 26 within the float. The entire bore is filled in this instance with two fluids, one of greater density than the other. Preferably I employ mercury 27 as the heavier liquid and oil 28 as the lighter liquid. As the sphere rotates at high speed about its north-south axis N—S, the mercury will assume a position surrounding the oil as shown. The outer thimble 25, therefore, being lighter than the mercury, acts as a float therein, while the inner cylinder, which is also preferably composed of steel, being heavier than the oil, acts as a sinker-weight in the oil in case the north-south axis of the sphere becomes inclined. The float 25 preferably has a small clearance between it and the interior of the fixed tube 24, and is also provided with a plurality of ears 28' (Fig. 9) which have a loose fit in the interior of the tube 24 so as to centralize the float.

In order that the displacement of the mercury and the movement of the float may apply a torque proportional to the tilt, I provide a means for normally centralizing the float so that its displacement on tilting will be proportional to the tilt. For this purpose I have shown the central portion of the interior of tube 24 as curved. Bearing against this curved surface 29 are one or more small rollers 30, each of which is guided by pins 31 projecting therefrom, which engage slots 32 in ears 33 on float 25 (see Fig. 7). Each roller 30 is made of material having somewhat greater density than mercury so that the centrifugal action will tend to keep the roller pressed outwardly against the curved surface 29. Preferably I construct the roller of two metals of different density, say with a platinum or gold interior and a steel shell 35. The shell may then be turned down until the required specific gravity is reached, which is preferably but slightly greater than that of mercury.

The inner weight 26 may be similarly centralized within the outer float as by similar roller or rollers 30' which bear against an arcuate section 34 on the interior of the outer float. The inner weight also has a clearance between it and the outer float and is centralized therein by similar ears 20' on the outer edge thereof and also by auxiliary sets of ears 36 between the outer sets so that when the float and weight become relatively displaced, the weight will still be radially centralized. The weight is also provided with a small bore 36', which, being central, is accessible only to the oil. It should also be noted that the clearances between the float and weight and between the outer wall and the float are accessible only to the mercury, the oil being in effect sealed in the center by the inner "wall" or line of demarcation between the oil and the much heavier mercury.

The operation of the float and weight in imparting meridian seeking and damping properties to the spherical rotor is as follows: Let us assume that the sphere is spinning with its axis of rotation horizontal and that it gradually assumes a slight tilt. As it does so the float will slowly rise as the mercury flows from the high to the low side of the ball. The amount of rise will be proportional to the tilt on account of the centralizing influence of the little rollers 30, which are pressed outwardly against the curved track 29 by the centrifugal force of the sphere. This shift in the center of gravity of the system to the low side will cause this sphere to behave as a top heavy, counter-earthwise-spinning gyroscopic compass.

As the outer float rises, however, the inner mass 26 will at first move in the opposite direction, i. e., to the low side of the gyroscope, since it is heavier than the oil. This movement, however, is retarded by the small bore of aperture 36 so that the principal change that takes place is that the weight 26 is left behind by float 25. It should be noted that the oil can escape from one side of the weight to the other only by passing through the small bore 36, since to escape in any other way it would have to displace mercury. Thus the rate of movement of the weight is governed by the size of bore 36. When the float is displaced, the centralizing effect of the roller 30' will exert a strong influence on the weight to move it up the incline, thereby gradually moving the weight to the high side of the gyroscope out of phase with the main gravitational weight movement, because this movement of the weight is also retarded by the resistance of the oil through the passage of small bore 36'. The result is that the gyroscope is effectively damped. It should be noted that all elements in the axial bore of the sphere are kept under high frequency vibration, due to the spinning of the ball, etc., thus keeping them free from static friction.

It is now recognized that it is desirable to maintain the period of the gyroscopic compass constant for all latitudes. The foregoing construction of the float lends itself admirably to the securing of this result by the variation of the rotor speed. In the ordinary gyro compass the period may be kept constant by this method only when the rotor speed is varied within very wide limits, say from three to four hundred percent, for a change of latitude from the equator to high latitudes. With my construction, however, such great change of rotor speed is not necessary, for not only is the factor $\omega$ (angular velocity) varied by change in rotor speed as it is in the ordinary compass, but also the gravitational factor is varied by the change in centralizing effort of the centrifugal rollers on the float. Thus, for low latitudes, the sphere is revolved faster than for high latitudes and this will not only increase $\omega$ in the equation, $$ = 2\pi \sqrt{\frac{I\omega}{mgl \cos. L}}$$

but will decrease the effective gravitational factor $ml$ (where $m$ is mass of the factor and $l$ the lever arm), because the float will move a less distance for a given tilt on account of the increased centralizing action of the little centrifugal rollers at the high speeds present. The variation of speed in accordance with the latitude may be effected easily with the induction type motor by varying the speed of the generator G (Fig. 2), and to this end I have shown the generator as driven by a variable speed motor M, the speed of which is varied from the field rheostat R in accordance with the latitude. If desired, latitude graduations L may be placed on the rheostat.

Another advantage of employing heavy liquid within the sphere is that it tends to compensate for imperfect balance about the axis of rotation, since the liquid will position itself so that the center of gravity of the whole lies closer to the center of the axial bore, i. e., the center of the sphere.

Intercardinal or quadrantal error is avoided in my compass by the fact that the flow of mercury from one side of the float to the other is retarded by the small clearances between the float 25 and weight 26 and between the float and inner wall of the outer tube 24. This retardation is made sufficient to prevent surging of the mercury in phase with the roll and pitch, but at the same time is not too much restricted, the design being such as to permit the proper movement of the mercury and float in phase with the course and speed changes of the ship so as to cause the proper ballistic deflection.

Another form of the invention is shown in Fig. 10. According to this form the curved surface 29' is formed by cutting a slot with straight side walls in the outer tube 24 instead of grinding a hollow spherical surface therein as in Fig. 6. Also, the small weights 130 are shown as pivoted on a lever 40 hinged to the outer float 25. Similarly the rollers 130' on the inner weight are hinged to the same and take in similar slots in the inner surface of the outer float. These slots may be formed in an inner lining 41 of said float, if desired. Small guide rollers 42 are also shown on the outer float instead of the ears 28' of the form shown in Fig. 6. The end flanges 45 are for the purpose of limiting the clearances and, therefore, rate of movement of the float so that it will not move appreciably in the period of the ship's roll. The operation of the two forms is otherwise the same.

It is, of course, not necessary to employ mercury and oil as the two liquids or even to employ two liquids in my invention, Fig. 13 showing one method of employing a single liquid, as explained hereinafter.

In Fig. 12 is shown a simple form of the invention in which centralizing springs are employed in place of the little centrifugal weight or rollers, and a single liquid of uniform density may be employed. In this form the main float 25' is slidably mounted on rods 37 extending between the threaded ends 23 and is normally centralized by balanced compression springs 46—47. Within the cylindrical float is slidably mounted the damping weight 48 on a tube 50' extending between ends 23. Said weight is centralized with respect to the float by springs 47' on similar rods 49 extending through the outer float between end brackets 50. Said springs bear against slidable plates 48', which are normally maintained against weight 48 and against stops 49' on said rods 49. Said rod 50' is shown as having slots near the center thereof through which extend pins 51 on a small piston 52, the pins taking in holes in the damping weight. Due to the loose fit of the damping weight on the tube, oil will fill the tube as well as the main portion of the cavity. The movement of the weight, however, will be opposed by the resistance of the oil within the tube to the movement of the piston 52, and since the slots may be made as narrow as desired it is obvious that appreciable resistance may be opposed to the movement of the weight whereby damping is secured, as outlined in connection with the other figures, but without the necessity of employing more than one liquid within the main cavity.

It should be noted that this particular form of gravitational and damping control is adaptable to other types of compasses than the ball compass. As it only employs a single liquid, it is not necessary that it be rotated about its longitudinal axis for operation so that it might be mounted across the horizontal axis of the ordinary type of gyroscope.

In Fig. 11 I have shown modifications in which a source of power is utilized to move the damping weight against gravity. For this purpose I may use the air pressure generated by the rotation of the sphere as a centralizing means for the damping weight. In this case the damping weight 48' is shown as slidably mounted on a tube 50' which is mounted at each end in the threaded caps 23'. The damping weight is shown as provided with a guiding and damping vane 53 which extends through a slot within the tube. The interior of the tube is also connected at each end to a bore 54 which extends radially outwardly through the threaded caps and emerges to the exterior of the sphere at a point removed from the axis of rotation thereof. The outward end of these air pasasges may be shaped to provide a scooping effect. The result is that a certain amount of air pressure (positive or negative) will be transmitted from the surface of the rapidly spinning sphere to within the tube 50' and exert a force on the vane 53. This force will normally be equal on both sides of the vane. I provide means, however, connected with the outer weight 25' to disturb this balance of pressure so as to positively move the damping weight to the high side of the gyroscope. For this purpose I have shown a slide valve 55 attached to each end of the weight 25' and which tends to close the passage-way at the high side between the bore 54 and the interior of the tube 52 as the weight sinks and to open said passage-way at the low side. This, it will be seen, will cause a force to be exerted on the damping weight to force it to the high side against gravity and damp the compass, the movement, however, being retarded by the very small clearance between the damping weight and the interior walls of the gravitational weight.

Another variation of this principle is shown in Fig. 14. In this figure the tube 50' leads entirely through end caps 23'' to the exterior of the sphere. Opposite the opening of said tube slightly below the same, I provide the entrance 55' to a bore 55 in the outer hollow sphere 4''. A bore is placed on each side of the sphere and leads to a point removed from the axis of rotation thereof. There will, therefore, be air pressure transmitted from the remote point to a point adjacent the tube. As long as the sphere's axis is horizontal both ends of the tube 50' will be equally open to the air emerging from the tube apertures. If, however, the axis becomes inclined, this air pressure will be disturbed and the weight forced to the higher side. It is, of course, obvious that air may be supplied from any source to orifice 55', if desired.

In Fig. 15 I have shown electro-magnetic centralizing means for the outer float. This is shown as an annular winding 56 in the stationary tube 24', current being led into the same by a small mercury column 57 leading outwardly to each side of the outer follow-up shell 4''' and opening at the axis of rotation on either side of the spherical rotor. A contact block 58 is provided at this point from which wires 59 lead to stationary contact block 60 in the cap 123 which contacts with the second block 61 in the tube 24'. The float itself is shown as provided with a band 63 of soft iron for localizing the magnetic field. In this instance the inner weight is shown as centralized by the centrifugal rollers 30' as in Fig. 6.

It has been found desirable in many instances to provide means for eliminating or reducing the damping factor during acceleration of the ship (i. e. change of course or speed). In order to effect this purpose in my compass I may employ means such as shown in Figs. 13 and 16. The general form of the floats shown in these figures is the same as shown in Figs. 6 and 10. In this instance, however, the damping weight is slidably mounted on a hollow tube 50' as in Fig. 12, and is provided with pins 51' passing through slots in the tube connected to pistons 52'.

In the form shown, therefore, only one liquid need be employed as in Fig. 13. In all forms having a central tube and piston it will be obvious that the weight should be long enough to cover the slots in the tube in all positions and thus prevent too free leakage. Adjacent one end of said tube 50' (Figs. 13 and 16) and within the same is shown a small plunger 73 of magnetic material (Fig. 16), which is shown as normally held retracted by spring 74. The said plunger is squared at one point 79 where it is provided with a cam slot 75 in which takes a pin or pins 76 on lock 77. With the plunger in the position shown in Fig. 16, the lock is normally withdrawn, but if the plunger is moved to the left in this figure, it will readily be seen that the lock will be moved upwardly so that the point thereof passes through a tapered aperture 78 in the wall of the tube 50' and engages the interior of the damping weight 26'', thus preventing movement thereof. For operating the plunger from without the sphere, I have shown an electro-magnet 80 which is adapted to be excited by any suitable means (not shown) when the ship turns or changes speed. The excitation of the magnet will attract the plunger and eliminate the damping at that time, without materially disturbing the balance of the compass. Means, such as a movable weight within the tube 50', may be provided to automatically compensate for any change of balance.

For actuating the follow-up motor 7 I prefer not to employ any means which contacts with the surface of the sphere. For this purpose I have shown as mounted at the center of one or both of the caps 23 and located substantially on the spinning axis of the gyroscope a small button 81 of different magnetic permeability than the ball proper. Since the ball in this instance is of bronze, I make the button of a magnetic material, such as steel. Preferably such a button is located on each side of the sphere (see Fig. 6). In the follow-up supporting shell, I locate a pair of windings 82, 83, 82', 83' on each side of the gyroscope, said windings constituting in effect a transformer with a variable gap in the magnetic circuit. As shown in Fig. 26 I may use the normal three phase current employed to drive the rotor for my follow-up system. The follow-up motor in this case is made reversible by converting it in effect into a two phase induction motor which is operable on the three phase circuit. One of the stator windings 70, which may be termed the main winding, is connected to two of the phases of the supply and a tap 84 is taken off said winding at a point between its ends, preferably near its center, similar to a Scott connection. Connected to said tap is one of the windings 85 which, together with the opposed winding 86, forms what may be termed the "teaser" windings.

The opposite end of the winding 85 is connected to the third phase of the supply so that two phase current is impressed on the motor. The opposed winding 86 is also excited as between said third phase and the Scott connection 84 so that normally the field is killed by the equal currents in said opposed windings, but means are provided, operated by the relative position of the sphere and shell, for disturbing this balance so as to operate the motor in one direction or the other to cause the shell to follow the sphere. As shown, the winding 86 is normally excited from a transformer 92, the primary of which is placed between said third phase and the Scott connection 84. The secondary of said transformer 92 supplies the main current to the primary windings on a second transformer 88, the secondary of which is in circuit with the aforesaid motor winding 86, and the value of the current in the aforesaid primary windings of the transformer 88 is also affected by the potentials on the grids of valves 94, 96, 97, which potentials are in turn controlled from the transformers on the gyroscope. As shown, the primary windings 82—82' of the transformers on the gyroscopes are controlled from the same third phase and Scott connection, while the secondaries 83—83' are cross connected so that when the buttons 81 on the two sides of the sphere are symmetrically placed with respect to the two transformers, no potential is generated in the secondary circuit, but when this symmetrical disposition is disturbed in one direction or the other a positive or negative potential is generated. Preferably a large number of turns of fine wire is employed on the transformers so that a substantial potential is secured with a minimum wattage in the circuit thus reducing the magnetic pull between the transformers and buttons 81 to a negligible value. The differential potential generated in the secondaries is impressed between the grid and filament of the thermionic valve 94. The output of this valve is multiplied by placing it in a suitable power multiplying circuit preferably of the push-pull type. As shown, the plate of said tube 94 is connected to the input transformer 95, which in turn is connected to one or more amplifying tubes 96—97. Said tubes are shown as placed in parallel and the plate of each is connected to the same primary windings on transformer 88 that the transformer 92 is connected to, so that the grid potentials in the thermionic valve circuit either aid or oppose the fluctuations in valves 96, 97 and consequently the values of the alternating currents in the windings 88 and 86. The output transformer 88 also serves to transform the pulsating direct current of the valve circuit into an alternating current for the motor.

It will readily be seen, therefore, that when the buttons 81 on the sphere are symmetrically placed, that is, when the spinning axis of the sphere is in line with the primary windings of the transformers on the shell, no voltage is generated by the amplifying circuit, and windings 86 and 85 exactly balance each other so that the motor 7 is not driven in either direction. When, however, the sphere's axis turns in one direction with respect to the transformer, the voltage impressed on the winding 86 will exceed, say, that impressed on 85 so that the motor is driven in one direction, while if the axis turns in the other direction the voltage in 86 will be reduced below that of 85 so that the motor is driven in the other direction.

In Figs. 27 and 28 a slightly different form of control is shown for the sphere. In this form only one button 81' need be employed on the sphere. It is obvious that if the sphere is of non-magnetic material the button or spot should be of magnetic material, but if the sphere is of steel, then, in both forms of the invention, the button or buttons should be formed by a depression in the steel ball which may or may not be filled with non-magnetic material.

The windings 182 and 182' in this form of the invention are placed upon U-shaped magnetic cores 99—100 positioned on the supporting shell adjacent and equidistant from the horizontal spinning axis of the sphere. The magnets are so wound that the adjacent poles 101 and 102 are alike so that the magnetic flux normally passes from pole 101 through the sphere to pole 101' and from pole 102 through the sphere to pole 102'. The other windings 183 and 183' in this instance may be placed on suitable cores on the control panel or elsewhere. The arrangement is such as to form what may be termed a reactance Wheatstone bridge in which the reactance of the windings 182—182' is varied by varying the magnetic circuits of the two magnets on which the windings are placed. As shown in Fig. 29, current is supplied to the circuit at the points 103 and 104 from the same connections that supply the windings 82 and 82' in Fig. 26, while the control potentials are taken off at mid-points 105—106 to operate a circuit which may be substantially similar to Fig. 26.

As hereinbefore stated an adequate supporting surface may be secured in the follow-up hollow sphere as described in connection with Fig. 3. In Figs. 17 to 21, however, I have illustrated a method by which an increased supporting effort may be secured. In Figs. 17, 18 and 21, the inner surface of the follow-up element is scalloped in a direction at right angles to the rotation of the sphere so as to provide a plurality of transversely extending ridges 93 and valleys 94' where the supporting air is compressed or squeezed between the rotating ball and its supporting member. In this form also the air for starting is shown as brought in through a bore 100' which leads to a point adjacent the horizontal axis of the sphere where it may be placed in communication with the source of supply of compressed air. Obviously this supply may be continued after the sphere is rotating if desired, just sufficient air being supplied to maintain the film of supporting air. Alternative forms of supporting surfaces are shown in Figs. 19 and 20. In Fig. 19 the interior surface of the hollow follow-up element is simply provided with shallow rounded depressions 102'' as shown, while in Fig. 20 a series of channels 103' sloping in the direction of rotation of the sphere is provided.

It is obvious that my ball type gyroscope is adapted to be employed in other types of gyro apparatus than gyro compasses. In Figs. 22, 23 and 24 I show it applied to a gunnery baseline apparatus. The sensitive element or sphere may be substantially the same as in the other forms of the invention except as to the interior construction. As the sphere is intended to stand still in space but to remain horizontal, I show an adjustable weight 105' mounted within a central aperture 106' in the sphere. Said weight is shown as threaded on screw 107, the head of which projects to the surface of the sphere and is shown as graduated in degrees of latitude. By adjusting this weight properly for latitude, the sphere may be given the proper rate of precession to compensate for the azimuthal component of the earth's rotation at that latitude.

In Fig. 24 I have shown a sensitive element in which the compensation for latitude is automatically taken care of. In this figure there is mounted within the bore of the sphere a single weight 108 immersed within a liquid of very nearly the same specific gravity as the weight, the weight being preferably slightly lighter. The weight may be centralized by small rollers 109 as in Fig. 6. Said rollers engage the curved surface 110. The theory of operation is that as the gyroscope becomes inclined the float will shift sufficiently to cause the gyroscope to precess at the proper rate to compensate for the earth's rotation.

It is, of course, possible to damp my improved sphere compass by means other than the movable weight in the sphere, such as shown in Figs. 6 to 16. In Fig. 25 I have shown a novel form of damping means which employs no damping element within the sphere. Accordingly there is only the gravitational factor-mass 125 within the central aperture in this form of compass. The damping is secured by the reaction between the sphere and follow-up container brought about by inclination of the spinning axis of the sphere. In order to secure this reaction by a simple method and without auxiliary apparatus, I may design both the stator windings and rotor element somewhat differently than in the other forms of my invention. In this instance the sphere may be again made of bronze and an iron or steel ring 120 may be cast into the periphery of the same although this is not necessary. Or the ball may be made of solid steel as stated hereinbefore. In case of relative lateral movement of the plane of spin and stator poles, due to tilt, an erecting torque will be exerted on the rotor tending to reduce the inclination of the sphere and hence to damp its oscillations.

It may be noted that the inductive winding 16 in these figures is shown as placed in the lower half 12' of the split shell instead of in the upper half 11'.

The manner in which this damping torque is produced about the vertical axis may be best seen by reference to the vector diagram in Fig. 26a. This diagram represents three dimensions. Line A represents the true vertical axis of the compass, line B the horizontal spinning axis of the sphere, and line C the horizontal axis at right angles to B. The vector O—V represents the torque of the stator on the sphere. When the axis of the sphere becomes inclined, the position of the spinning axis will then be represented by the dotted line B' while its normally vertical axis becomes dotted line A'. The stator, however, which remains in the true vertical will still exert a torque O—V on the sphere which may be resolved into two components, one of which O—V' represents the component around the axis of rotation of the sphere and the other O—P represents the component around the normally vertical axis of the sphere, causing it to precess about its horizontal axis and thus reducing the inclination and damping its oscillations.

It should be noted that the damping factor in this type of compass may readily be varied by changing the relative breadth of ring 120 with respect to the stator 17, the minimum damping being secured in a solid magnetic sphere. It may be noted that the damping factor is varied automatically with a change in speed of the sphere for different latitudes and also with the coefficient of friction, since the amount of damping varies with the strength of the erecting couple due to the stator. This is a distinct advantage over the fixed type damper of the prior art. The less the torque required to spin the ball the less the erecting couple, but it should be borne in mind that the damping couple should be small in any event so as not to annul the tilt before the gravitational factor has had opportunity to set up precession toward the meridian.

It will be obvious to those versed in the art that the element 4 (Fig. 25) and all parts mechanically attached thereto may be stabilized around either or both horizontal axes. This may be done by securing to the element at a point just below the stator 17 (Fig. 25) a small gyroscope rotating in a normally horizontal plane. Stabilizing the element 4, and, therefore, the stator would have the advantage of eliminating or minimizing the so-called damping or turning error found in all gyro compasses. This error arises from displacement or deflection of the damping element when such element is subjected to acceleration pressures arising from changes of course or speed. With the method of damping shown in Fig. 25, this damping error would be eliminated by completely stabilizing the stator carrying element around the horizontal axis at right angles to the normal axis of rotation of the sphere.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a ball gyroscope, the combination with the ball, of a hollow generally spherical casing adapted to enclose at least the bottom portion of the same, and electrical means for spinning the ball, the inner surface of the enclosing sphere being of uniform diameter slightly larger than the ball so that the ball generates a substantially self-sustaining air film by its rotation.

2. In a ball gyroscope, the combination with the ball, of a hollow cup adapted to support the same, electrical means for spinning the ball, the inner surface of the enclosing cup being of uniform diameter slightly larger than the ball so that the ball generates a substantially self-sustaining air film by its rotation, and means for introducing compressed air between said ball and casing in starting.

3. A ball gyroscopic compass or the like, the combination with the ball, of a horizontally split shell enclosing the same, and an inductive winding on the one half only of said shell for spinning said ball.

4. In a ball compass, the combination with the ball, of a cup shaped member for supporting the same on the air film generated by the rotation of the ball, A. C. inductive means for spinning the ball, and gravitationally responsive means within the ball for imparting meridian seeking properties thereto.

5. A gyroscopic compass comprising a sphere, means for spinning said sphere about a substantially horizontal axis, means for supporting said sphere when spinning on a film of air for freedom for turning in any direction, and gravitationally responsive means within the sphere for imparting north seeking properties thereto.

6. A gyroscopic compass comprising a sphere, means for spinning said sphere about a substantially horizontal axis, and means for supporting said sphere when spinning on a film of air for freedom for turning in any direction, said sphere having a bore therethrough along said horizontal axis, a fluid within said bore, and a solid mass supported by said fluid.

7. A gyroscopic compass comprising a sphere, means for spinning said sphere about a normally horizontal axis, means for supporting said sphere when spinning on a film of air for freedom for turning in any direction, gravitationally responsive means within the sphere both for imparting north seeking properties thereto, and for damping the oscillations of the sphere.

8. A gyroscopic compass comprising a sphere, means for spinning said sphere about a normally horizontal axis, and means for supporting said sphere when spinning on a film of air for freedom for turning in any direction, said sphere having a bore therethrough along said horizontal axis, immiscible liquids of different density in said bore and adapted to be separated by rotation of the sphere, relatively movable masses of different density than the liquid in which it is normally immersed, in each liquid, respectively, and means for retarding the movement of one mass with respect to the other on tilt of the sphere.

9. A gyroscopic compass comprising a sphere, means for spinning said sphere about a normally horizontal axis, and means for supporting said sphere when spinning on a film of air for freedom for turning in any direction, said sphere having a bore therethrough along said horizontal axis, a fluid within said bore, a mass supported by said fluid, and means for yieldingly centralizing the mass longitudinally of said bore.

10. A gyroscopic compass comprising a sphere, means for spinning said sphere about a normally horizontal axis, and means for supporting said sphere when spinning on a film of air for freedom for turning in any direction, said sphere having a bore therethrough along said horizontal axis, a liquid within said bore, a mass supported by said liquid, and means responsive to centrifugal force mounted on the periphery of said mass and adapted to cooperate with an inclined surface on the interior of said bore for centralizing the mass longitudinally of the bore.

11. A gyroscopic compass comprising a sphere, means for spinning said sphere about a normally horizontal axis, and means for supporting said sphere when spinning on a film of air for freedom for turning in any direction, said sphere having a bore therethrough along said horizontal axis, a liquid within said bore, and a mass supported by said liquid, the clearances of said mass being such as to prevent surging of the liquid and float on rolling and pitching of the ship in phase therewith.

12. In a gyroscopic compass, a combined gravitational and damping factor therefor comprising a liquid container adapted to extend transversely across the E—W axis of the compass, a float therein for imparting meridian seeking properties to the compass, a mass of greater density than the liquid in said container, yielding means for causing said mass to follow the movements of said float, and means for retarding said following movements.

13. In a gyroscopic compass, a combined gravitational and damping factor therefor comprising a liquid container adapted to extend transversely across the E—W axis of the compass, a hollow float therein for imparting meridian seeking properties, a mass within said float of greater density than the liquid, yielding means connecting said mass and float for causing said mass to follow the movements of said float, a tube on which said mass is slidably mounted and a piston within said tube and connected to said mass for retarding the movements thereof.

14. In a gyroscopic compass, a combined gravitational and damping factor therefor comprising a liquid container adapted to extend transversely across the E—W axis of the compass, a float therein for imparting meridian seeking properties, a mass of greater density than the liquid in said container, yielding means for causing said mass to follow the movements of said float, means for retarding said following movements, and means operable from without the sphere for locking the mass to eliminate the damping.

15. A gyroscope comprising a sphere, a hollow shell supporting the same, means for spinning the sphere, means for supporting the same on air film, a tube leading through the sphere along its spinning axis, a mass having a piston extending with the tube, and means for varying the flow of air through said tube on tilt of the spinning axis of the sphere to move said mass by differential air pressure on said piston.

16. In a ball gyroscope, the combination with the ball, of a hollow generally spherical casing or cup adapted to support the same, means for spinning the ball within the cup, and a follow-up electrical motive means for driving the casing to maintain it in a predetermined position with respect to the spinning axis of the cup.

17. In a ball gyroscope, the combination with the ball, of a hollow generally spherical casing or cup adapted to support the same, means for spinning the ball within the cup, a follow-up motive means for driving the casing to maintain it in a predetermined position with respect to the spinning axis of the cup, said ball having adjacent the spinning axis thereof a spot of different magnetic permeability than the ball, opposed windings on said casing adjacent said spot, means for amplifying the variations produced by relative movement of said spot and windings to drive said motive means in the proper direction to follow the spin axis of the ball.

18. In a ball gyroscope, the combination with the ball, of a hollow cup adapted to support the same, means for spinning the ball within the cup, a follow-up motive means for driving the casing to maintain it in a predetermined position with respect to the spinning axis of the ball, said ball having adjacent the spinning axis thereof on each side a spot of different magnetic permeability than the ball, a transformer on each side of said casing adjacent said spots, said spots forming variable gaps therefor, and amplifying means connected with cross-connected secondaries of said transformers to control the direction of actuation of said motive means.

19. In a ball gyroscopic compass, the combination with the ball, of a supporting hollow spherical shell therefor adapted to support said ball by an air film at its periphery when spinning, and A. C. inductive means for spinning the ball about a horizontal axis, said means being of such a character as to leave the ball free to turn around either axis perpendicular to the spinning axis without applying any centralizing torque thereon.

20. In a ball gyroscopic compass, the combination with the ball, of a supporting hollow spherical shell therefor adapted to support said ball by an air film at its periphery when spinning, means within the ball for imparting meridian seeking properties to said ball, and electrical means on the shell for spinning said ball and reducing tilt of the spinning axis of said ball with respect to the shell whereby the compass is damped.

21. In an A. C. follow-up system for gyroscopes, the combination with the polyphase supply, sensitive and follow-up elements, of a polyphase multi-winding reversible induction motor for driving the follow-up element and having a winding excited from a phase of said supply, variable gap transformers mounted on one of said elements and having the primaries thereof also excited from the same phase of said supply, the secondaries of said transformers being cross-connected, magnetic means on the other element forming the variable gap of said transformer, amplifying means actuated from said secondaries, a third transformer having two primaries, one of which is actuated from said amplifying means and the other from another phase of said supply, the secondary thereof being connected to another opposed winding on said motor.

22. A non-contacting non-current-carrying electrical means for causing the supporting element of a generally spherical spinning body to follow the movements of the spinning axis thereof comprising the combination with the said body and element, opposed inductive windings on said element each having an open magnetic circuit, magnetic material on said body adjacent said spinning axis adapted to vary oppositely the gap of each of said circuits upon relative movement of said element and body, amplifying means actuated by the differences in the two windings, and motive means controlled thereby for turning said element.

23. A non-contacting non-current-carrying electrical means for causing the supporting element of a rapidly spinning generally spherical gyro rotor element to follow the movements of the spinning axis thereof comprising the combination with the said elements, opposed variable magnetic circuits, one part of each of which is on said element and another part on said body, opposed inductive windings forming a part of said circuits, and motive means controlled thereby for turning said following element in either direction.

24. A non-contacting non-current-carrying electrical means for causing the supporting element of a rapidly spinning generally spherical gyro rotor element to follow the movements of the spinning axis thereof comprising the combination with the said elements, opposed variable magnetic circuits, one part of each of which is on each of said elements, opposed inductive windings forming a part of said circuits, amplifying means controlled by said inductive means, and motive means controlled thereby for turning said following element in either direction.

25. In an A. C. follow-up system for sensitive elements, the combination with the polyphase supply, sensitive and follow-up elements, of a motor for driving the follow-up element and excited from a phase of said supply, variable gap transformers mounted on one of said elements and having the primaries thereof also excited from said supply, the secondaries of said transformers being cross-connected, magnetic means on the element forming the variable gap of said transformer, amplifying means actuated from said secondaries, and an output transformer having the secondary thereof inductively coupled to a winding of said motor.

26. In a gyroscopic compass, the combination with the sensitive element including the rotor, of a variable gravitational factor therefor which varies inversely as a function of the speed of rotation of the rotor, and means for varying the gravitational factor by varying the speed of rotation to maintain the period constant in different latitudes.

27. In a gyroscopic compass, the combination with the sensitive element including the rotor, of a variable gravitational factor therefor comprising a mass freely mounted for movement along the axis of said rotor, centrifugal means for centralizing said mass, and means for varying the rotor speed for the purpose specified.

28. A gyroscopic compass comprising a sphere, means for spinning said sphere about a normally horizontal axis, and means for supporting said sphere when spinning on a film of air for freedom for turning in any direction, said sphere having a bore therethrough along said horizontal axis, a liquid within said bore, a mass supported by said liquid, and means for limiting the displacement of the mass to an amount proportional to the tilt.

29. In a ball gyroscopic compass, the combination with the ball, of a supporting shell therefor, said ball being supported when running by the air film between said shell and ball, and electrical means on the shell and ball for spinning said ball and reducing tilt of the spinning axis of said ball with respect to the shell to damp the oscillations of the same comprising an induction stator winding and poles in said shell, said ball having at least a portion thereof adjacent said poles of magnetic material.

30. A non-contacting non-current-carrying electrical means for causing the following element of a sensitive element to follow the movement thereof comprising the combination with the said elements, variable magnetic circuits, one part of each of which is on each of said elements, a three-phase supply for energizing said circuits, opposed inductive windings connected to one phase of said circuits, amplifying means controlled by the output of said inductive means, and a Scott connected two-phase motor driven in part from said supply but governed as to direction of rotation and torque by the output of said amplifying means.

31. In an A. C. follow-up system for sensitive elements, the combination with the polyphase supply, sensitive and follow-up elements, of a polyphase multi-winding reversible induction motor for driving the follow-up element and having a winding excited from a phase of said supply and a teaser winding, variable gap transformers mounted on one of said elements and having the primaries thereof also excited from a phase of said supply, the secondaries of said transformers being cross-connected, magnetic means on the element forming the variable gap of said transformer, a push-pull amplifying means actuated from said secondaries, the output transformer thereof being connected to a teaser winding on said motor.

32. In an A. C. follow-up system for sensitive elements, an oscillatory thermionic valve circuit, means brought into action by relative movement of the sensitive and follow-up elements for disturbing the balance of said circuit and varying the amount and sign of the current in the plate circuit, an A. C. follow-up motor, and push-pull amplifying means controlled from said plate circuit for passing sufficient current in the proper direction to drive the motor in the proper direction to cause the follow-up element to follow the sensitive element.

33. In a ball gyroscope, the combination with the ball-like rotor, a cup for supporting the same on a self-generated air film, and a non-contacting electronic tube follow-up system for maintaining said cup in a predetermined position with respect to the spinning axis of said rotor.

34. In a ball compass, the combination with the ball, of a cup-shaped member for supporting the same on the air film generated by the rotation of the ball, A. C. inductive means for spinning the ball, and gravitationally responsive means connected to the ball for imparting meridian seeking properties thereto.

35. A gyroscopic compass comprising a sphere, means for spinning said sphere about a substantially horizontal axis, means for supporting said sphere when spinning on a film of air for freedom for turning in any direction, and gravitationally responsive means connected to the sphere for movement along its spinning axis for imparting north seeking properties thereto.

36. In an A. C. follow-up system for sensitive elements, the combination with the polyphase supply, sensitive and follow-up elements, of a polyphase multi-winding reversible induction motor for driving the follow-up element and having a winding excited from a phase of said supply and a teaser winding, variable gap transformers mounted on one of said elements and having the primaries thereof also excited from a phase of said supply, the secondaries of said transformers being cross-connected, magnetic means on the other element forming the variable gap of said transformer, a push-pull amplifying means actuated from said secondaries, the output transformer thereof being connected to a teaser winding on said motor.

37. In a ball gyroscopic compass, the combination with the ball, of a supporting shell therefor, a movable mass within the ball for imparting meridian seeking properties to the compass, and electrical means on the shell for spinning said ball and opposing tilt of the spinning axis of said ball with respect to the shell whereby the compass is damped.

38. In a ball gyroscopic compass, the combination with the ball, of a supporting shell therefor, means for pendulously suspending said shell to maintain its average position vertical, a movable mass within the ball for imparting meridian seeking properties to the compass, and electrical means on the shell for spinning said ball and opposing tilt of the spinning axis of said ball with respect to the shell whereby the compass is damped.

39. A gyroscopic compass comprising a sphere, means for spinning said sphere about a substantially horizontal axis, means for supporting said sphere when spinning on a film of air for freedom for turning in any direction, gravitationally responsive means within the sphere for imparting north seeking properties thereto, a follow-up support for said sphere supporting means, and a non-contacting controller for turning said support in azimuth with the spin axis of said sphere.

40. In a ball gyroscopic compass, the combination with the ball, of a supporting shell therefor, means for pendulously suspending said shell to maintain its average position vertical, follow-up means for turning said shell to maintain said electrical means fixed in azimuth with respect to the spin axis of the ball, a movable mass within the ball for imparting meridian seeking properties to the compass, and electrical means on the shell for spinning said ball and opposing tilt of the spinning axis of said ball with respect to the shell whereby the compass is damped.

41. A gyroscopic compass comprising a sphere, means for spinning said sphere about a normally horizontal axis, and means for supporting said sphere when spinning on a film of air for freedom for turning in any direction, said sphere having a bore therethrough along said horizontal axis, a fluid within said bore, a mass supported by said fluid, and magnetic means within the bore for normally centralizing the mass within the bore and causing the displacement thereof produced by tilt of the sphere to be proportional to the tilt.

42. In a gyroscopic compass, a gravitational control system therefor comprising a liquid container extending in a N—S direction on the compass, a float therein which tends to move to one end or the other of said container on tilt of the compass, and means for limiting the displacement proportionally to the tilt.

43. A gyroscopic compass as claimed in claim 42 in which the float displacement limiting means is a magnetic centralizing means acting on the float.

44. In a ball gyroscopic compass, the combination with the ball, of a supporting shell therefor completely and closely surrounding the ball and supporting the same on an air film when the ball is spun, electrical means on the shell for both spinning said ball and imparting a damping torque to the same, and gravitational means for imparting meridian seeking properties thereto, said damping torque being small as compared with the gravitational torque by reason of the small spinning torque required to maintain the spin of the ball in the enclosing shell.

REGINALD E. GILLMOR.